Patented Jan. 16, 1951

2,538,248

UNITED STATES PATENT OFFICE 2,538,248

ISOMERIZATION OF OLEFINS

Vladimir N. Ipatieff, Chicago, and George S. Monroe, Berwyn, Ill., assignors to Universal Oil Products Company, Chicago, Ill., a corporation of Delaware No Drawing. Application November 28, 1947, Serial No. 788,646

5 Claims. (Cl. 260—683.2)

This invention relates to the isomerization of olefins containing more than three carbon atoms per molecule using a copper-nickel-silica composite as the catalyst.

In one embodiment our invention relates to a process for isomerizing olefins which comprises subjecting an olefin containing more than three carbon atoms per molecule to the action of a copper-nickel-silica isomerization catalyst at isomerizing conditions.

In a more specific embodiment our invention relates to a process for the conversion of 1-olefins to 2-olefins which comprises subjecting a 1-olefin containing more than three carbon atoms per molecule to the action of a copper-nickel-silica isomerization catalyst at a temperature of from about 150° C. to about 450° C.

In another specific embodiment our invention relates to a method of increasing the octane number of thermally cracked gasoline which comprises contacting a thermally cracked gasoline at isomerizing conditions with a copper-nickel-silica isomerizing catalyst and recovering the isomerized product.

The isomerization processes in which our new catalyst is utilizable fall into two broad classes, namely, the isomerization of pure olefin compounds and the isomerization of complex mixtures of olefin compounds. The first of these includes isomerizations such as the conversion of 1-butene to 2-butene, alpha pinene to camphene, and 1-octene to a mixture of nonterminal straight-chain olefins, such as 2- and 3-octene, and tertiary type olefins such as 2-methyl-2-heptene. The second class includes the treatment of thermally cracked or reformed gasolines to improve the octane number thereof. This treatment is sometimes called isoforming and is characterized by 95–99% yields of isomerized product together with very low losses to gas, coke, and higher boiling hydrocarbons.

The olefinic hydrocarbons that may be isomerized in our process comprise those containing more than 3 carbon atoms per molecule. Generally, however, normally liquid olefins are somewhat more readily isomerized than are the butenes. Branched chain, normally liquid olefins such as 2-alkylalkenes are particularly susceptible to isomerization. The olefins to be isomerized in our process may be either of the open chain or of the cyclic variety.

Full boiling range thermally cracked or reformed gasoline may be isoformed in the presence of our catalyst. However, certain portions of such gasolines respond differently to isoforming, hence it sometimes is advantageous to separate such gasolines into one or more fractions and contact each with our catalyst under optimum conditions for that particular fraction. For the same reason, it sometimes is advantageous to recycle a portion of the product to the isoforming step.

The catalyst used in our process comprises a composite of copper, nickel, and silica. A particularly effective catalyst contains 7.6% copper, expressed as the oxide, 69.3% nickel, expressed as the oxide (4% was actually present as the oxide), and 23.1% kieselguhr. This catalyst was prepared by suspending diatomaceous earth, also known as kieselguhr, in a dilute aqueous solution of copper sulfate and nickel sulfate and then gradually adding thereto an excess of a saturated solution of sodium carbonate in water. The mixture of copper and nickel sulfate solution and diatomaceous earth was agitated vigorously while the sodium carbonate solution was introduced thereto to form a precipitate which was removed by filtration and was washed with water, dried, heated, and reduced with hydrogen. If the precipitation is effected at about 70° C. the final catalyst ordinarily will have a longer life than if the precipitation is effected at a substantially different temperature. Various other forms of silica, particularly synthetically prepared silica, may be used in the preparation of our catalyst. The nickel content preferably should be within the range of from about 1 to about 20%, but is usually within the range of from about 5 to about 15%.

The presence of copper in our catalyst brings about a lower carbon forming tendency and a longer life than is found in the corresponding nickel-silica catalyst. However, our catalyst does not differ from nickel-silica merely in degree, but differs in its fundamental directionalizing activity. This is shown by the fact that when steam and 1-butene are passed over our catalyst at approximately 300° C., selective isomerization to 2-butene is the chief reaction; whereas, when nickel-silica is employed, hydrogenation to normal butane and cracking to lower boiling hydrocarbons are the predominant reactions with substantially no isomerization to 2-butene.

The process of this invention may be carried out in batch operation by placing a quantity of the catalyst in a reactor equipped with a stirring device, adding the olefin hydrocarbon reactant, heating to a reaction temperature, maintaining the contents of the reactor at the reaction temperature for the desired period of time, and recovering the product. However, the preferred method of operation is of the continuous type. In one mode of continuous operation, the catalyst particles are placed in a reactor and the heated reactants are passed therethrough at suitable operating conditions. If the catalyst is in a finely divided state, it may be placed in a reactor and the charge passed therethrough causing the catalyst particles to become motionalized and forming a fluid-like mass. Another alternative method of continuous type operation comprises suspending the catalyst in a stream of charge and treating the resulting suspension under suitable conditions of temperature and pressure to effect the desired isomerization.

When the catalyst becomes deactivated the carbonaceous deposits thereon may be removed by combustion followed by reduction in order to at least partially restore the activity.

The process of this invention may be conducted at temperatures within the range of from about 150° C. to about 450° C. At temperatures below about 150° C., very little reaction takes place; at temperatures above 450° C. the selective isomerizing action of the catalyst is lessened and random cracking and splitting increases.

Pressure does not appear to be a critical variable in our process.

The following example is given to illustrate our invention, but it is not introduced with the intention of unduly limiting the generally broad scope of said invention.

*Example I*

Two continuous type experiments were made in which 1-butene was passed through a reduced catalyst, the composition of which was, prior to reduction, 7.6% copper oxide, 69.3% nickel oxide, and 23.1% kieselguhr.

|  | Run No. 1 | Run No. 2 |
|---|---|---|
| Process Conditions: |  |  |
| Pressure, p. s. i. g. | 500 | |
| Temperature, Avg. Cat., °C | 298 | 349 |
| HLSV, Water | 2.8 | 3.2 |
| HGSV, 1-Butene | 559 | 447 |
| Mole Ratio, Steam/1-Butene | 6.3 | 8.9 |
| Yields as Wt. Per Cent 1-Butene Chg.: |  |  |
| Lower Paraffins | | 1.7 |
| $C_2$-$C_3$ Hydrocarbons | 4.1 | 10.4 |
| n-Butene | 66.2 | 51.7 |
| 1-Butane | 9.3 | 18.3 |
| Liquid Hydrocarbons (Polymer) | 3.3 | 1.5 |
| Inspection of Cond. Gas, Mole Per Cent: |  |  |
| Carbon Dioxide | 1.8 | 0.0 |
| Ethylene | 2.7 | 0.0 |
| Ethane | 0.5 | 0.0 |
| Propylene | 1.1 | 0.0 |
| Propane | 0.7 | 13.7 |
| Isobutane | 0.0 | 0.0 |
| n-Butane | 8.7 | 17.9 |
| Isobutylene | 0.0 | 0.0 |
| 1-Butene | 24.1 | 16.8 |
| 2-Butene | 58.4 | 50.1 |
| Butadiene | 0.0 | 0.4 |
| $C_5$+Fraction | 2.0 | 1.1 |
| Total | 100.0 | 100.0 |

It can be seen that a high conversion of 1-butene to 2-butene was obtained in the first run whereas in the second run, which was made at a higher temperature, more hydrogenation was effected. When water is not present there is virtually no hydrogenation and the yields of isomerate are increased by a corresponding amount.

Although these data show that no isomerization of 1-butene to isobutylene was obtained at these particular conditions, isomerization of the type involving migration of methyl and higher alkyl groups is obtained with our catalyst with higher boiling olefins.

We claim as our invention:

1. In the isomerization of an olefin containing more than 3 carbon atoms per molecule, the isomerizing step which consists of subjecting said olefin to the action of copper-nickel-silica catalyst containing a major proportion of nickel at a temperature of from about 150° C. to about 450° C.

2. In the isomerization of a 1-olefin containing more than 3 carbon atoms per molecule to the corresponding 2-olefin, the isomerizing step which consists of subjecting said 1-olefin to the action of copper-nickel-silica catalyst containing a major proportion of nickel at a temperature of from about 150° C. to about 450° C.

3. In the isomerization of a 1-olefin containing more than 3 carbon atoms per molecule to the corresponding 2-olefin, the isomerizing step which consists of subjecting said 1-olefin to the action of copper-nickel-kieselguhr catalyst containing a major proportion of nickel at a temperature of from about 150° C. to about 450° C.

4. The process of claim 3 further characterized in that said 1-olefin is 1-butene.

5. In the isoforming of thermally cracked gasoline, the isomerizing step which consists of subjecting said gasoline to the action of copper-nickel-silica catalyst containing a major proportion of nickel at a temperature of from about 150° C. to about 450° C.

VLADIMIR N. IPATIEFF.
GEORGE S. MONROE.

REFERENCES CITED

The following references are of record in the file of this patent:

UNITED STATES PATENTS

| Number | Name | Date |
|---|---|---|
| 2,326,779 | Houdry | Aug. 17, 1943 |
| 2,354,866 | Lang | Aug. 1, 1944 |
| 2,431,920 | Cole | Dec. 2, 1947 |